United States Patent [19]
Boer

[11] Patent Number: 6,061,610
[45] Date of Patent: May 9, 2000

[54] METHOD AND APPARATUS FOR DETERMINING WORKLOAD OF MOTOR VEHICLE DRIVER

[75] Inventor: Erwin R. Boer, Brighton, Mass.

[73] Assignee: Nissan Technical Center North America, Inc., Farmington Hills, Mich.

[21] Appl. No.: 08/962,610

[22] Filed: Oct. 31, 1997

[51] Int. Cl.[7] .................................................. G08B 21/00
[52] U.S. Cl. ............................. 701/1; 701/301; 340/576; 180/272
[58] Field of Search .................................... 701/1, 41, 96, 701/301; 180/271, 272, 280; 340/575, 576

[56] References Cited

U.S. PATENT DOCUMENTS

| 4,219,800 | 8/1980 | LeViness | 340/576 |
|---|---|---|---|
| 4,359,725 | 11/1982 | Balogh et al. | 340/576 |
| 4,594,583 | 6/1986 | Seko et al. | 340/576 |
| 4,604,611 | 8/1986 | Seko et al. | 340/576 |
| 4,706,072 | 11/1987 | Ikeyama | 340/576 |
| 5,012,226 | 4/1991 | Love | 180/272 |
| 5,574,641 | 11/1996 | Kawakami et al. | 701/1 |

*Primary Examiner*—Gary Chin
*Attorney, Agent, or Firm*—McDermott, Will & Emery

[57] ABSTRACT

A steering angle sensor monitors the steering angle of a vehicle as the vehicle is driven. The steering angle signal is input to a processing device which generates steering angle prediction errors based on the received steering angle. The processing device then generates a distribution of steering angle prediction errors. The distribution of prediction errors is compared to the distribution of steering angle prediction errors representing load-free driving. The comparison represents the driver's workload.

37 Claims, 10 Drawing Sheets

| | $b_1$ | $b_2$ | $b_3$ | $b_4$ | $b_5$ | $b_6$ | $b_7$ | $b_8$ | $b_9$ |
|---|---|---|---|---|---|---|---|---|---|
| $-\infty$ | $-5\alpha$ | $-2.5\alpha$ | $-\alpha$ | $-0.5\alpha$ | $0.5\alpha$ | $\alpha$ | $2.5\alpha$ | $5\alpha$ | $\infty$ |

METHOD AND APPARATUS FOR DETERMINING WORKLOAD OF MOTOR VEHICLE DRIVER

TECHNICAL FIELD

The present invention relates to monitoring and determining the workload of a motor vehicle driver.

BACKGROUND ART

Motor vehicle safety devices have continuously improved over the years and have made driving a safer experience. Many of these safety devices, such as seat belts and air bags are designed to protect occupants in the event of a crash. Other devices, such as anti-lock braking systems are intended to assist the driver's performance to prevent a crash. Such systems assume an alert driver, but this is not always the case. A driver may not be fully alert for any number of reasons. These include drowsiness, talking on a cellular phone, changing the radio stations and dealing with unruly children, for example.

A third category of safety devices includes those that detect the alertness of a driver. An example of a device that detects the alertness of a driver are vehicle monitoring systems that monitor the position of a steering wheel as the vehicle is driven. These systems are designed to recognize when the driver becomes drowsy based on detecting a period of time in which no steering adjustments are made. Alternatively, these systems may recognize when a driver becomes drowsy based on a steering adjustment whose speed exceeds a predetermined value over a relatively wide angle of steering.

These prior art monitoring systems that detect drowsiness operate on the raw steering angle data. A drawback with these monitoring systems is that they depend on the curvature profile of the road as well as the speed of the vehicle. Therefore these systems may be somewhat useful on straight lane driving, but are not useful in typical driving situations in which the road curvature profile varies.

Another drawback is that the prior art drowsiness monitoring systems do not consider situations where the driver is performing other tasks while driving. For example, such prior art systems do not recognize that the driver may be talking on the telephone or changing radio stations while driving. These prior art systems essentially perform a binary determination of whether a driver is drowsy based on the raw steering angle data and do not consider whether steering adjustments or lack of steering adjustments may be caused by factors other than drowsiness. Hence, these prior art systems do not correlate steering to a driver's secondary workload to generate a continuous index of driver workload.

SUMMARY OF THE INVENTION

There exists a need for a steering monitoring system that monitors vehicle steering angle and takes into account secondary driver activities.

There is also a need for a steering monitoring system that correlates secondary driver activities and steering to create a steering index based on driver workload.

These and other needs are met by the present invention, where a steering angle sensor monitors the steering angle of a vehicle as the vehicle is driven. The steering angle signal over a period of time is used to generate predicted steering angles. The predicted steering angles may then be used to generate an index representing a driver's workload or secondary task load.

According to one aspect of the invention, a method for determining driver workload is provided. The method includes monitoring a steering angle of a vehicle over a period of time. The method also includes generating steering angle prediction errors based on the monitored steering angle at predetermined intervals of time. The method further includes generating a workload value based on the generated steering angle prediction errors.

Another aspect of the present invention provides a system for generating a workload value representing a driver's workload. The system includes an input device configured to receive a steering angle signal representing the angle of a vehicle's steering wheel. The system also includes a workload monitoring device coupled to the input device that is configured to receive the steering angle signal and generate a workload value based on the received steering angle signal.

Other objects and advantages of the present invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

BRIEF DESCRIPTION OF THE DRAWINGS

Reference is made to the attached drawings, wherein elements having the same reference numeral designations represent like elements throughout.

FIG. 6 illustrates the exemplary ranges of each bin used to create the steering angle prediction error distribution.

DETAILED DESCRIPTION OF ILLUSTRATED EMBODIMENTS

Figure 1:
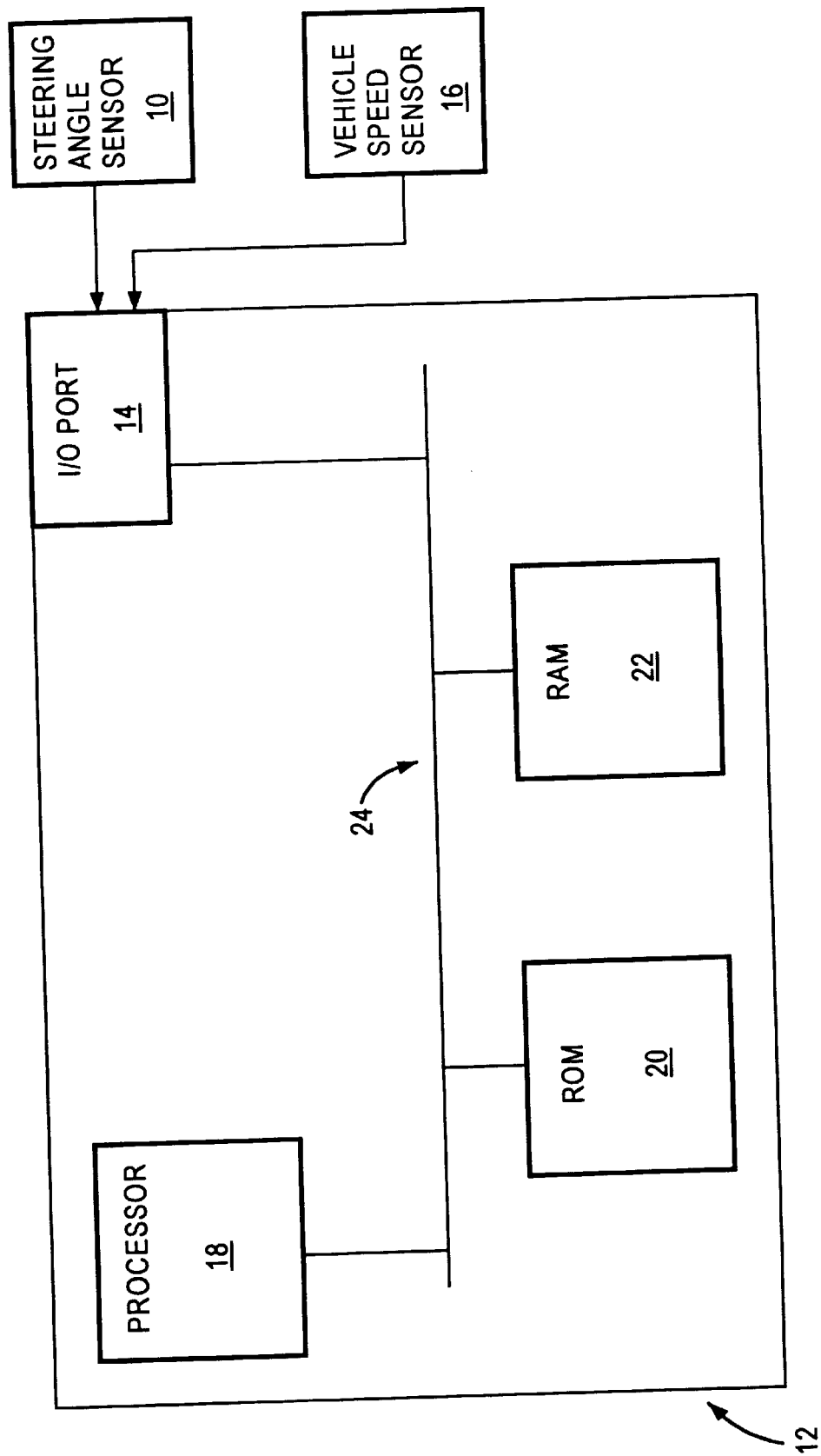
FIG. 1 is a block diagram of a workload monitoring system in accordance with the invention.

FIG. 1 is a simplified block diagram of a system for monitoring a driver's workload in accordance with one embodiment of the present invention. In FIG. 1, a steering angle sensor 10 monitors the steering angle of the steering wheel of a vehicle and outputs the steering angle to a workload monitoring device 12, via I/O port 14. Optionally, a vehicle speed sensor 16 for detecting and signaling vehicle speed may also be coupled to I/O port 14. The workload monitoring device 12 includes a bus 24 or other communication mechanism for communicating information from the I/O port 14 to processor 18. The workload monitoring device 12 further comprises a random access memory (RAM) 22 or other dynamic storage device, coupled to processor 18 for storing information and instructions to be executed by processor 18. RAM 22 also may be used for storing temporary variables or other intermediate information during execution of instructions by processor 18. The workload monitoring device 12 also comprises a read only memory (ROM) 20 and/or other static storage device coupled to bus 24 for storing static information and instructions for processor 18.

The workload monitoring device 12 is an exemplary system suitable for implementing the present invention. Routine operations performed by depicted components will generally not be described, such operations being well understood in the art. Other components not shown could be added or substituted for those depicted and certain of the depicted components could be reconfigured or eliminated, if desired.

The steering angle sensor 10 can be any sensor device that monitors the steering angle of a steering wheel. For example, the steering angle sensor 10 may comprise the sensor disclosed in U.S. Pat. No. 4,604,611, assigned to the assignee of the present invention. Alternatively, the steering angle sensor 10 could be a sensor that monitors the steering angle by monitoring the wheels of the vehicle, instead of the steering wheel. However, details of the steering angle sensor 10 are not necessary to understanding the present invention and most steering angle sensors are suitable for use with the present invention.

As discussed earlier, systems that monitor the steering angle of a vehicle in order to determine driver drowsiness are known. However, these systems generally do not consider circumstances in which the driver may be preoccupied with other tasks while driving.

The present invention monitors the steering angle in order to generate an index representing a driver's secondary workload. The invention is based on the notion that attentive, well-trained drivers exhibit smooth, highly-predictive steering profiles with minimal discontinuities under non-taxing driving situations. Performing secondary tasks while driving requires the driver to redirect some attentional resources away from the primary driving task. A secondary task includes any task that takes attentional resources away from the primary driving task, including contemplation and speech. As drivers engage in secondary tasks, discontinuities may enter into the steering profile in the form of error corrections applied when attention is redirected back to the primary driving task. These discontinuities, caused by divided attentional resources, result in less predictable steering angles.

For example, suppose a driver is driving on a moderately curved road and decides to change radio stations. At some appropriate time, the driver looks down to the radio, reaches over and presses some button several times. Once the driver looks at the road again, the driver realizes that the car has drifted slightly. To correct for this error, the driver turns the steering wheel faster than when continuously paying attention to the road. This relatively sudden, faster than normal steering correction causes the steering angles surrounding this corrective maneuver to be less predictable. By accumulating prediction errors over a predetermined time history and comparing them against an estimate of what the prediction errors would have been if the driver would have been fully attentive to the primary driving task (null distribution), an estimate of the secondary workload is obtained.

The absolute difference between the entropy of the null distribution and the entropy of the observed distribution may be used as an index for workload. Alternatively, the ratio between the two entropy values may be used with the maximum of the null divided by the observed and the observed divided by the null, defining the workload. In this manner, the workload is sensitive to an increase in error corrective behavior as well as a decrease in error corrective behavior experienced during drowsiness or sleep conditions.

Three driving scenarios are generated as test cases to illustrate the correlation of a driver's secondary workload to a vehicle's steering angle prediction error distributions. Described in detail below are the three test cases, followed by a detailed description of the invention as used in real driving environments.

TEST CASES

In the three test cases, two subjects (AS and AJ), control a car's heading (steering) as well as speed (gas/brake) during a test. The subjects' task consists of driving on a 7.5 kilometer (km) long test road. The test road is composed of straight leading and trailing segments, each 1.25 km long, with a slowly winding segment of 5.0 km in between the straight segments.

Figure 2:
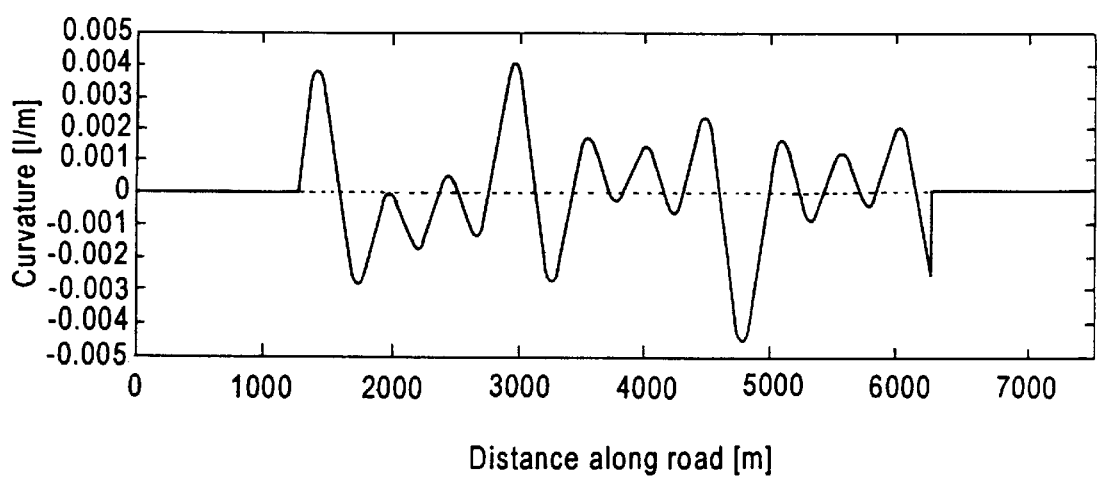
FIG. 2 illustrates the curvature of a road used to generate test data.

FIG. 2 illustrates the curvature of the road used in the test cases. A speed of 55 mph could easily be maintained in all curves of the road. Each subject, AS and AJ, drives the road several times under the following three conditions:

1) NULL: driver performs no secondary tasks.
2) COUNT: driver counts down, as fast as comfortably possible, starting from 950 by subtracting 7 each time.
3) TAPE: driver presses the cassette tape door as frequently as comfortably possible.

The three scenarios chosen are exemplary only and other scenarios could have been used to illustrate the concept of the invention. Additionally, the data obtained in the three scenarios is via a driving simulator. However, test data could have been obtained over any real or simulated road having any type of curvature profile.

The drivers repeat the same task throughout a test trial. Different tasks are assigned to different test trials. To ensure that every task follows every other task an equal number of times, the drivers perform the following sequence of tasks: NULL, COUNT, TAPE, NULL, TAPE, COUNT, NULL.

Figure 3A:
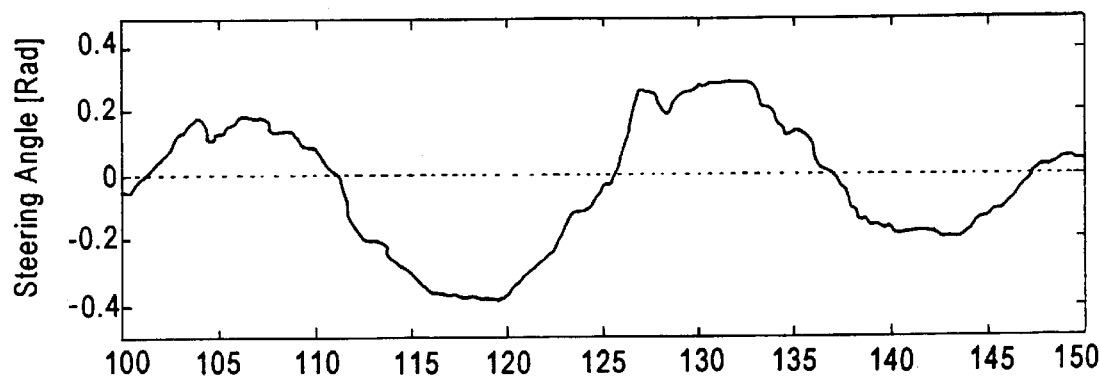
FIG. 3A illustrates the observed steering angle signal obtained under load-free driving over a portion of the test road of FIG. 2.
Figure 3B:
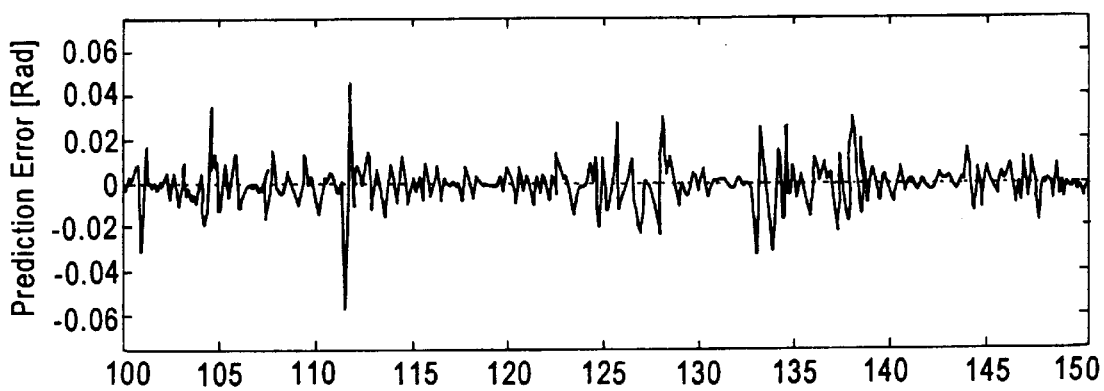
FIG. 3B illustrates the steering angle prediction error for the steering angle signal of FIG. 3A.
Figure 3C:
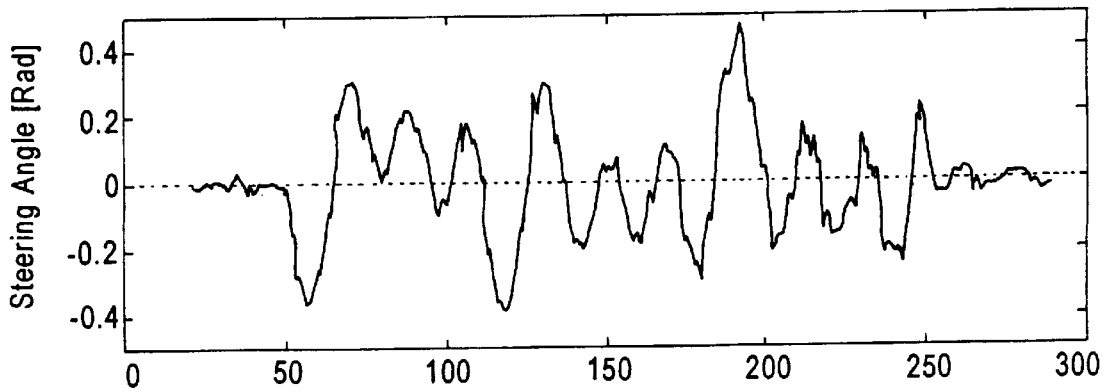
FIG. 3C illustrates the observed steering angle signal obtained under load-free driving over the test road in FIG. 2.

As each driver drives the test road, the steering angle sensor 10 monitors the steering angle and outputs a steering angle signal to the I/O port 14 of the workload monitoring device 12. FIG. 3C illustrates the steering angle signal over the entire 7.5 km course for subject AS performing the NULL task. FIG. 3A illustrates a short segment of the signal of FIG. 3C.

The processor 18 receives the steering angle signal from I/O port 14 via bus 24 and generates a steering angle prediction error over the test course based on the monitored steering angle. There are many ways in which to predict the steering angle. In the exemplary embodiment, the processor 18 performs a Taylor series expansion of the monitored steering angle signal to predict the steering angle at a future time. However, any prediction filter or extrapolator can be used as long as the prediction method is capable of eliminating the effect of simple steering through a curve when the driver is attentive.

In the exemplary embodiment, the processor 18 performs the Taylor series expansion of the monitored steering angle signal in FIG. 3C and generates a predicted steering angle $\hat{\theta}_n$.

The prediction $\hat{\theta}_n$ of the steering angle $\theta_n$ at time $nT_s$ is obtained by the k-th order Taylor expansion on a noise filtered version $\tilde{\theta}_n$ of $\theta_n$ given by:

$$\hat{\theta}_n = \tilde{\theta}_{n-1} + \sum_{l=1}^{k} \frac{T_s^l}{l!} \Delta_l \tilde{\theta}_{n-1} \quad (1)$$

where $$\Delta_l \tilde{\theta}_{n-1} = \Delta_{l-1} \tilde{\theta}_{n-1} - \Delta_{l-1} \tilde{\theta}_{n-2} \quad (2)$$

$$\Delta_0 \tilde{\theta}_{n-1} = \tilde{\theta}_{n-1}$$

and k=2.

The observed values of the steering angle of up to time "n−1" are used to predict the steering angle at time "n". Samples are assumed evenly spaced at a sampling interval of $T_s$ seconds.

Once the processor 18 generates the predicted steering angle, the processor 18 then computes a steering angle prediction error $e_n$ given by the formula:

$$e_n = \theta_n - \hat{\theta}_n \quad (3)$$

The processor 18 computes the prediction error only for samples kl to create a time series with an effective sampling interval ($T_s$) of 150 milliseconds (ms). FIG. 3B illustrates the steering angle prediction error $e_n$ for the signal illustrated in FIG. 3A for subject AS.

Next, the processor 18 transforms the time series of prediction errors $e_n$ into a discrete distribution of prediction errors. First, the processor 18 establishes nine bins $b_i$, as shown in FIG. 6 where α is selected such that 90 percent of the prediction errors fall within the range [−α, α]. In FIG. 6, the value shown under the bin number is the upper bin boundary. For example, bin $b_2$ ranges between −5α and −2.5α. However, the particular number of bins and ranges for each bin may be modified as the present invention is not sensitive to the number of bins or the particular ranges for each bin.

The probability, $p_i$, that the prediction error falls in a given bin $b_i$ is computed from the frequency distribution, i.e., the number of occurrences per bin divided by the total number of samples. The processor 18 computes the entropy $H_p$ for this time series based on the following calculation:

$$H_p = \sum_{i=1}^{9} -p_i \log_9 p_i \quad (4)$$

A logarithm with base 9 is used to assure that $H_p=1$ if the prediction error falls equally often in each bin. However, this will never occur under load-free or steady state driving conditions since the bins were selected such that 90 percent of the prediction errors fall in the three bins, $b_4$–$b_6$.

$H_p$ indicates the uncertainty in predicting in which bin the steering angles prediction error falls at any arbitrary time. Compared to steady state driving or a null scenario, $H_p$ increases as drivers perform secondary tasks.

Figure 4A:
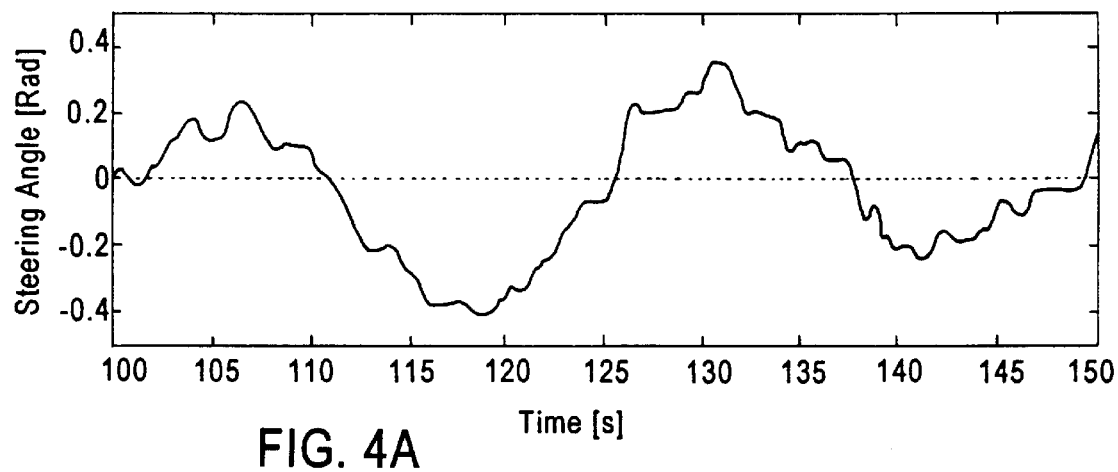
FIG. 4A illustrates the observed steering angle signal obtained while the driver performs a manual task over a portion of the test road of FIG. 2.
Figure 4B:
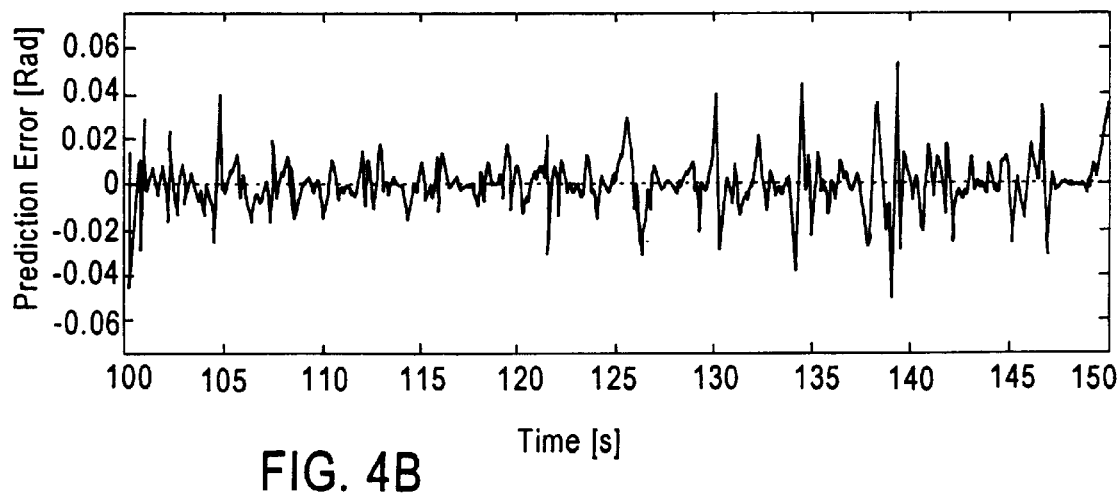
FIG. 4B illustrates the steering angle prediction error for the steering angle signal of FIG. 4A.
Figure 5A:
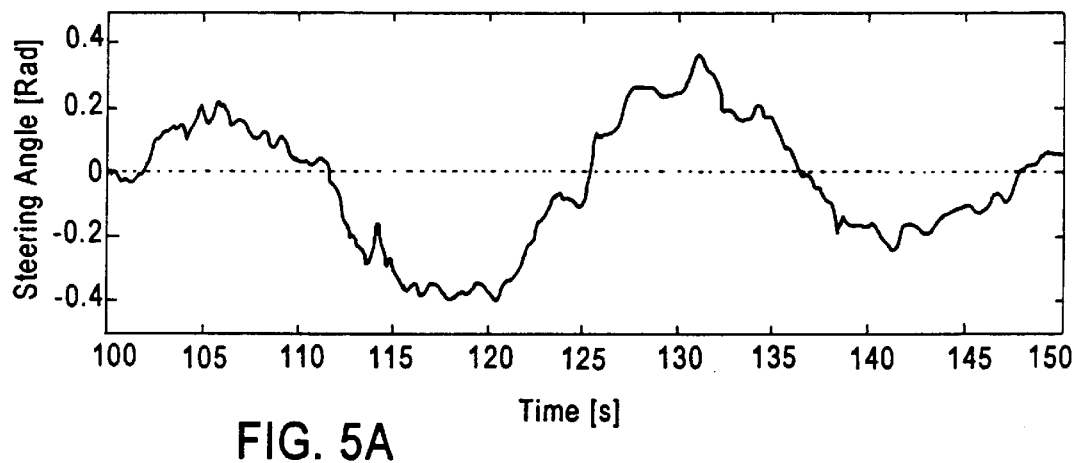
FIG. 5A illustrates the observed steering angle signal obtained while the driver performs a cognitive/verbal task over a portion of the test road of FIG. 2.
Figure 5B:
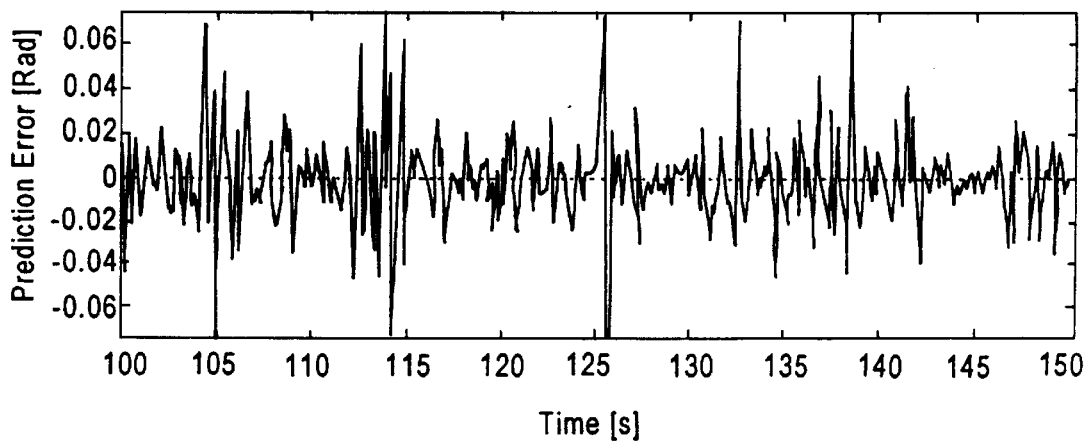
FIG. 5B illustrates the steering angle prediction error for the steering angle signal of FIG. 5A.

FIGS. 4A and 4B illustrate the steering angle signal and prediction error, respectively, for driver AS performing the TAPE task. Similarly, FIGS. 5A and 5B illustrate the steering angle signal and prediction error for driver AS performing the COUNT task.

As shown in FIG. 3A, the steering angle shows a certain number of discontinuities which are the result of naturally occurring attention lapses and errors in intended steering actions. The resulting natural distribution of steering angle prediction errors defines the null distribution. FIGS. 4A and 4B show that the number, as well as the magnitude of discontinuities (i.e. prediction errors) increases substantially when drivers perform secondary tasks. In short, the natural frequency and magnitude of steering corrections is significantly affected during secondary task performance. This difference is quantified in the method described.

The present invention creates the entropy measure as an index of predictability. The entropy of the observed distribution is computed by binning the observed prediction errors. In the exemplary embodiment, the bin boundaries are established using the set of prediction errors that characterize load-free driving. However, as discussed earlier, the number of bins and particular ranges for each bin may be changed. The only requirement for the bins and bin boundaries is that the resulting distribution should be provide a distribution of samples with a number of samples in each bin, so that the distribution will be meaningful.

The entropy measure may then be used to characterize the workload (manual or cognitive) induced by different secondary tasks. Generally, workload is considered high over a given time interval when the entropy of the discrete probability distribution of prediction errors in the steering angle profile exceeds that of the null distribution observed under load-free, fully attentive driving. In an alternative embodiment, the variance of the steering angle prediction errors may be used to calculate a workload index.

Figure 7:
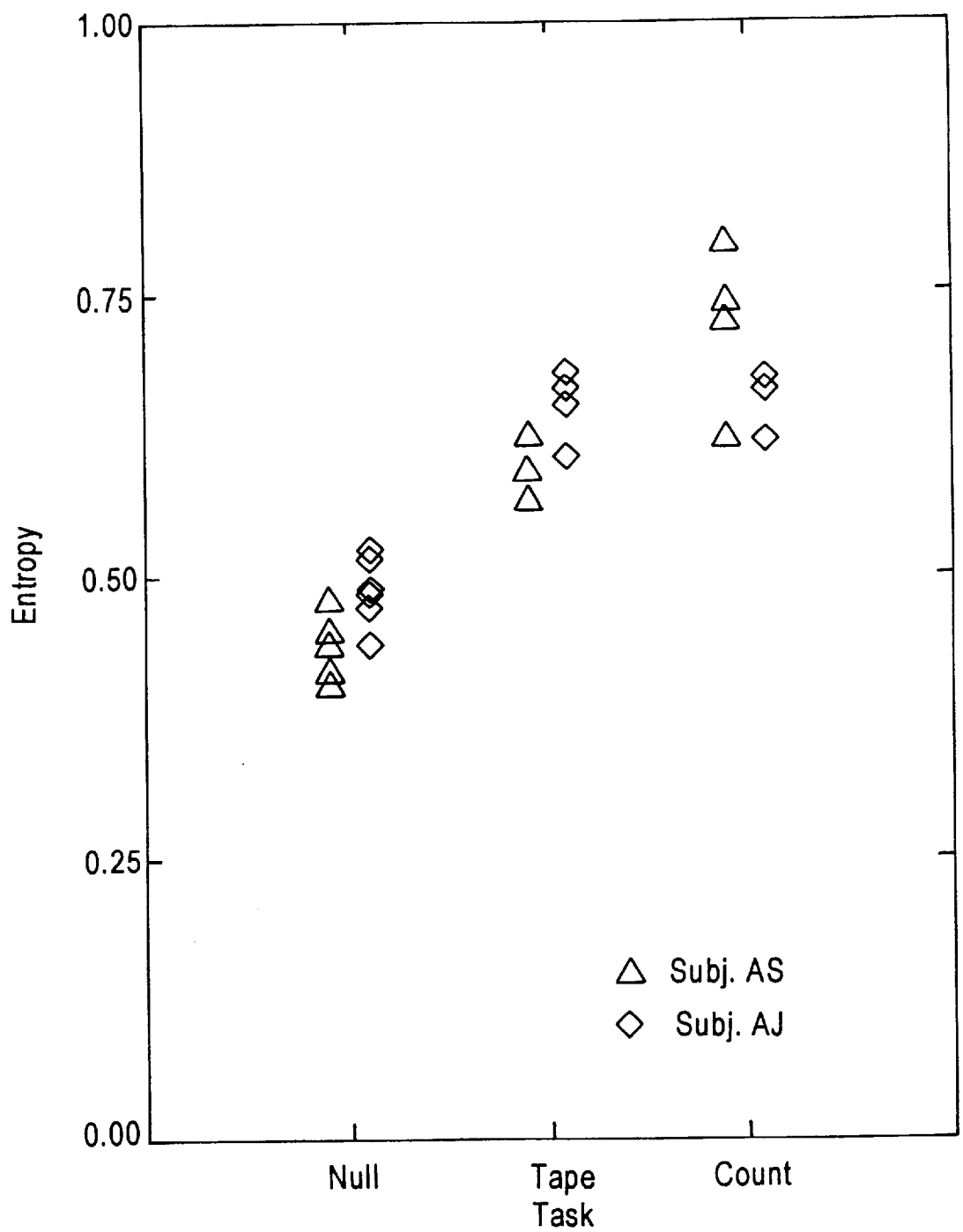
FIG. 7 illustrates the calculated entropy values for various tasks obtained over the test road of FIG. 2.

FIG. 7 illustrates the calculated entropy values, $H_p$, for both subjects over a number of the test scenarios. From FIG. 7, the entropy is lowest for the NULL task and increases for the TAPE and COUNT tasks.

It is clear that the entropy measure $H_p$ is sensitive enough to show the effect of secondary tasks. The three scenarios chosen illustrate that entropy measures can be used to capture the effect of manual and cognitive loads on steady state driving.

WORKLOAD INDEX GENERATING SYSTEM

Figure 8:
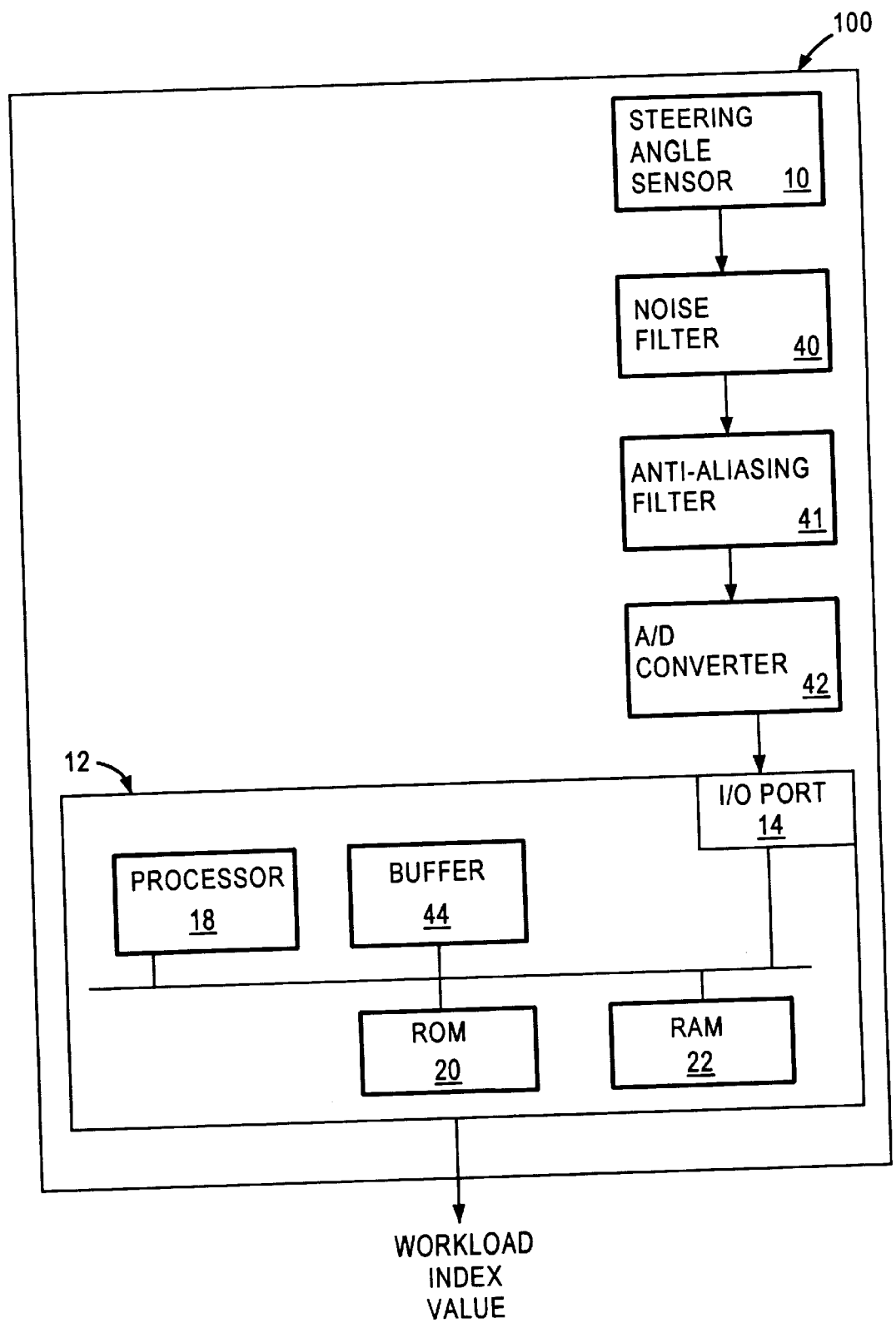
FIG. 8 is a block diagram of the workload monitoring system in accordance with the invention.

As described above, the steering angle may be used to generate an entropy value $H^p$ that varies with a driver's workload. FIG. 8 is a block diagram of the workload monitoring system 100 in accordance with the present invention. A steering angle sensor 10 monitors the steering angle of a vehicle as the vehicle is driven. As described above with reference to FIG. 1, in exemplary embodiments the steering angle sensor 10 is a conventional sensor which monitors steering angle. For example, the sensor may comprise the sensor disclosed in U.S. Pat. No. 4,604,611, assigned to the assignee of the present invention.

The steering angle sensor 10 may introduce a certain amount of noise into the monitored angle. A noise filter 40 is coupled to the steering angle sensor 10 and filters out the sensor noise. In exemplary embodiments of the invention, the noise filter 40 is any one of a number of conventional filters known in the art. An anti-aliasing filter 41 receives the analog signal from noise filter 40 and operates as a low-pass filter to prevent high frequencies from being folded into the lower frequency range. In exemplary embodiments of the invention, the anti-aliasing filter 41 is any one of a number of conventional filters which are well known in the art. The only requirement for anti-aliasing filter 41 is that it filter out all frequencies above the Nyquist frequency (fn) associated with the sampling frequency (fs) of A/D converter 42. Essentially, fn should be no greater than one-half of fs. If the frequency spectrum of the noise introduced by the steering angle sensor 10 has most of its power above fn, then noise filter 40 is not needed. However, if a significant amount of noise is introduced below fn, noise filter 40 is used or the cutoff frequency of anti-aliasing filter 41 can be decreased to filter out the noise component.

The anti-aliasing filter 41 is coupled to an A/D converter 42 which converts the filtered steering angle signal into digital format for processing by the workload monitoring device 12. In the exemplary embodiment, a 16-bit A/D converter 42 is used to create 65,536 ($2^{16}$) levels to represent plus or minus two full steering wheel rotations or 1440 degrees. The use of the 16-bit A/D converter 42 is more than sufficient to keep quantization noise to an acceptable minimum. Additionally, the sampling interval of A/D converter 42 is set at several times the prediction ahead time (In the exemplary embodiment, the prediction ahead time is set at 150 ms and is discussed below).

Alternatively, in the case when a limited number of quantization levels are used in A/D converter 42, a box filter can be used to reduce the effect of the quantization noise induced by A/D converter 42. In such a situation, the box filter averages $\theta_n$ over three adjacent samples based on the following equation:

$$\tilde{\theta}_{n-k} = \frac{1}{3} \sum_{i=-1}^{1} \theta_{n-k*l+i} \tag{5}$$

where $\theta_{n-k}$ represents the noise filtered signal and l is set such that the samples used in the prediction are effectively spaced at predetermined intervals. In the exemplary embodiment, the predetermined interval is set between 100 ms and 200 ms, although this number can be changed without significantly affecting system performance.

Figure 9:
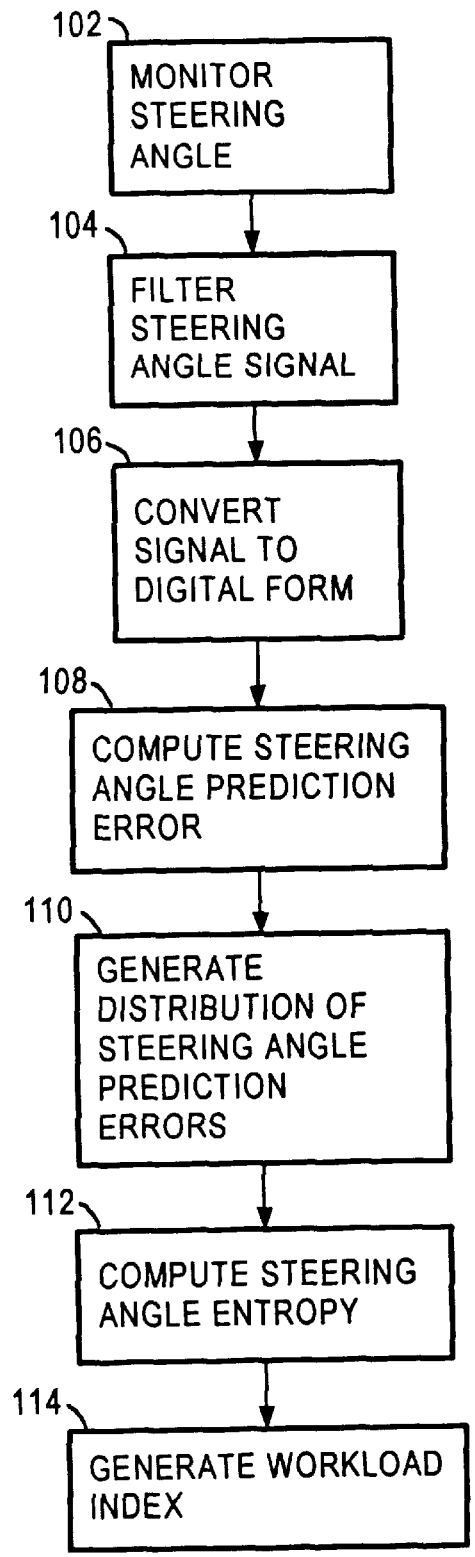
FIG. 9 is a flow diagram illustrating the generation of the workload index.

The workload monitoring device 12 receives the digital signal from A/D converter 42 and generates a workload index, based on the observed steering angle signal. FIG. 9 is a flow diagram illustrating the steps in an exemplary method for generating the workload index according to the present invention.

As discussed above, the steering angle sensor 10 monitors the steering angle of a vehicle, at step 102. At step 104, the noise filter 40 and anti-aliasing filter 41 filter the steering angle signal. Next at step 106, A/D converter 42 converts the analog signal into digital form for processing by the workload monitoring device 12.

At step 108, the workload monitoring device 12 computes a steering angle prediction error. In step 108, buffer 44 first receives the filtered steering angle signal in digital form through I/O port 14 via bus 24. The storage functions performed by buffer 44 could alternatively be satisfied by RAM 22. The processor 18 then accesses the steering angle data from buffer 44 and computes a steering angle prediction error $e_n$ for a number of samples spaced apart by periods of time.

As discussed above, in manual control systems the inherent intermittency interval is generally assumed at 150 ms. This corresponds to the time interval it takes human drivers to assess a situation, plan a steering action and execute the steering action to a point where it significantly differs from the steering angle at the point of initial perception. For this reason, the exemplary period for generating steering angle prediction errors is set at 150 ms. However, the period may be changed based on various external factors, such as the particular driver or vehicle speed.

To compute the steering angle prediction error in step 108, the processor 18 first performs a k-th order Taylor series expansion of the monitored steering angle signal to calculate a predicted value $\hat{\theta}_n$ of the noise filtered version $\theta_n$ of $\theta_n$ at time $nT_s$, given by:

$$\hat{\theta}_n = \tilde{\theta}_{n-1} + \sum_{l=1}^{k} \frac{T_s^l}{l!} \Delta_l \tilde{\theta}_{n-1} \tag{6}$$

where $$\Delta_l \tilde{\theta}_{n-1} = \Delta_{l-1} \tilde{\theta}_{n-1} - \Delta_{l-1} \tilde{\theta}_{n-2} \tag{7}$$

$$\Delta_0 \tilde{\theta}_{n-1} = \tilde{\theta}_{n-1}$$

and k=2. However, any other value of k could also be used.

Additionally, as discussed earlier, any prediction filter or extrapolator can be used to predict the steering angle as long as the prediction method is capable of eliminating the effect of simple steering through a curve when the driver is attentive. For example, a situation adaptive driver model, described in detail below, that takes into account the effect of environmental variables on driver's steering may be used.

Next, the processor 18 computes a steering angle prediction error $e_n$ given by the formula:

$$e_n = \theta_n - \hat{\theta}_n \tag{8}$$

The processor 18 stores the computed steering angle prediction errors in buffer 44. Next, at step 110, the processor 18 generates a discrete distribution of steering angle prediction errors $e_n$ into the nine bins discussed above and illustrated in FIG. 6. As new data is received and new prediction errors are calculated, the processor 18 updates the distribution based on the newly calculated steering angle prediction errors $e_n$.

As discussed earlier, the number of bins may be changed based on the particular driver or various error tolerances. In the exemplary embodiment, the bin boundaries are established using the set of prediction errors that characterize load-free driving. The method used to generate the null distribution that characterizes load-free driving may be the method described in detail above that uses the Taylor series extrapolation, a method using an Expectation Maximization algorithm (discussed in detail below), a method using a situation adaptive driver model (discussed in detail below) or any other method capable of characterizing load-free driving. The only requirement for the bins and bin boundaries is that the resulting distribution should provide a distribution of samples with a number of samples in each bin, so that the distribution will be meaningful.

At step 112, the processor 18 computes a steering angle entropy $H_p$. The entropy $H_p$ for this distribution of steering angle prediction errors $e_n$ is defined by the equation:

$$H_p = \sum_{i=1}^{9} -p_i \log_9 p_i \tag{9}$$

where $p_i$ represents the probability that the predicted steering angle sample falls in bin $b_i$.

The processor 18 computes the entropy value $H_p$ every predetermined interval of time and stores the result in buffer 44. At step 114, the processor 18 generates a workload index by comparing the generated entropy value $H_p$ to the entropy of a null distribution of prediction errors obtained under load-free, fully attentive driving.

There are many ways in which the null distribution may be generated. In a first method, the null distribution is based on experimentally obtained data. That is, the steering angle of the vehicle is monitored over a period of time under load-free, fully attentive conditions. The processor 18 generates a null distribution of steering angle prediction errors in the manner discussed above. This null distribution may be obtained over normal driving conditions, including city and highway driving as well as good road conditions and poor conditions. Generally, the only requirement for generating the null distribution is that the steering angle data obtained should be obtained while the driver is operating under load-free, fully attentive conditions.

The processor 18 then generates the entropy $H_p$ of the steering angle prediction errors based on the equation:

$$H_p = \sum_{i=1}^{9} -p_i \log_9 p_i \qquad (10)$$

where $p_i$ represents the probability that the predicted steering angle sample falls in bin $b_i$. This is the same formula used to calculate the observed steering angle entropy. In the exemplary embodiment, the processor 18 stores the null distribution in ROM 20. Alternatively, the null distribution may be pre-stored in ROM 20.

Once the processor generates the entropy $H_p$ for the observed steering angle prediction errors, the processor 18 compares the stored entropy for the null distribution of steering angle prediction errors to the currently observed entropy. For example, assume that the entropy of the null distribution is 0.5 and the current entropy at time T is 0.75. In the exemplary embodiment, the processor 18 calculates a workload index based on the absolute difference between the entropy of the null distribution and the entropy of the observed distribution. Therefore, in this example, the workload index is 0.25. Alternatively, the ratio between the two entropy values may be used with the maximum of the null divided by the observed (0.5/0.75) and the observed divided by the null (0.75/0.5), defining the workload. In this example using the ratio method, the workload is 1.5. In a further alternative, the entropy of 0.75 may be used as the workload index. As new steering angle errors are computed, the processor 18 generates a new current entropy and the workload index changes. In this manner, the workload index functions as a continuous index of driver workload as experienced over a time history. Alternatively, the processor 18 may compute the current entropy $H_p$ based on a finite number of steering angle prediction errors generated over a predetermined period of time. For example, the processor 18 may use a one minute time duration (or any other predetermined duration) consisting of 400 (60 s/150 ms) steering angle prediction errors. As the processor 18 generates the 401st steering angle prediction error $e_n$, the first prediction error is dropped out of the distribution or "forgotten". In this manner, the workload index may indicate driver workload during finite durations of time.

Using a finite period of time to generate the current entropy may be useful when road conditions change. For example, suppose that the driver is traveling from an area in which the road conditions change from dry to icy. In this situation, the current observed distribution may be outdated based on the changed road conditions. For example, in such situations, both the current and null distributions may be based on dry road conditions and include steering angle prediction errors based on only dry road conditions. Therefore, the current distribution may forget the data obtained during the dry road conditions and begin creating a new current distribution based on the icy road conditions. Similarly, the ROM 20 may include pre-stored null distributions based on the particular road conditions, ranging from icy to dry. In this manner, the workload monitoring system 100 compares the entropy of the current icy conditions to a null entropy based on icy conditions. This provides a more accurate entropy comparison.

One alternative method of generating the null distribution of steering angle prediction errors uses an Expectation Maximization (EM) algorithm. The EM algorithm is a general purpose algorithm known in the art. The EM algorithm estimates the parameters of a mixture of distributions that underlie observations, such as observed steering angles. Individual steering angle samples are distributed across all members of a fixed set of parameterized distributions (generally of the exponential family) according to the likelihood with which each distribution can explain the data point. These weighted data samples are then used to update the distribution's parameters and the processor 18 calculates an entropy based on the weighted samples.

In essence, the EM algorithm basically offers a method to simultaneously update the null (load-free) and loaded steering angle prediction error distributions based on the notion that drivers' attention fluctuate naturally and both conditions are observed intermixed. The null distribution receives only a subset of all samples while the observed distribution is based on all samples to obtain an estimate of the workload over a predetermined time interval.

A third method of generating a null distribution of steering angle prediction errors uses a situation adaptive driver model. This method does not use sensed steering angles to generate the null distribution, but predicts the steering angles based on the vehicle state, local and global road geometry, as well as other external variables that characterize the driving situation.

Figure 10:
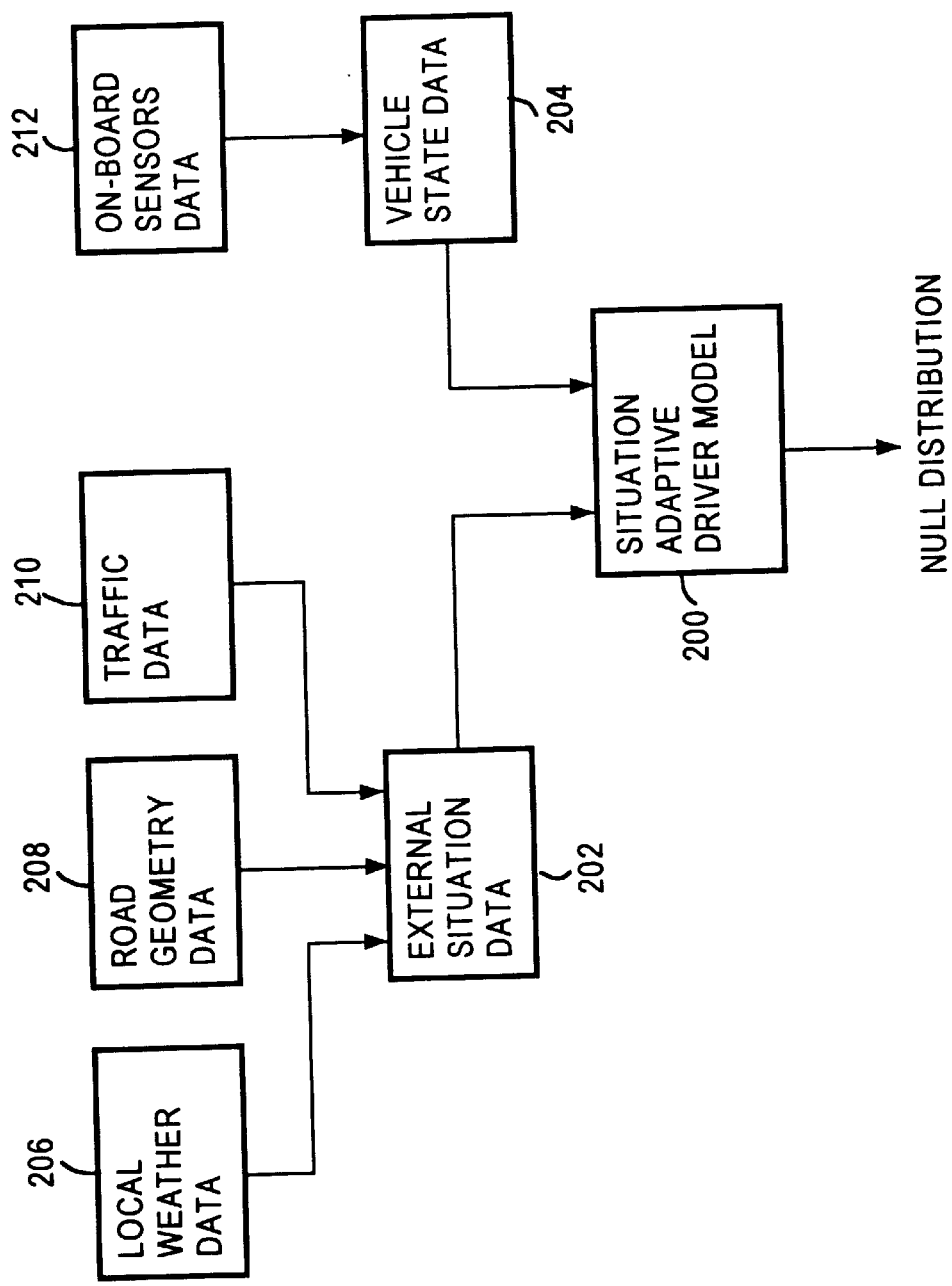
FIG. 10 is a block diagram of the situation adaptive driver model.

FIG. 10 illustrates inputs into the situation adaptive driver model 200. The situation adaptive driver model 200 includes external situation data 202 and vehicle state data 204. The external situation data may include local weather data 206, road geometry data 208 via a global positioning system (GPS), traffic data 210 and other similar data input. The vehicle state data 204 includes data obtained from on-board vehicle sensors 212, such as vehicle heading, vehicle speed and vehicle tread wear.

The situation adaptive driver model 200 assumes a completely attentive driver under load-free conditions. As the driver drives a particular road, the processor 18 calculates a null distribution of steering angle prediction errors based on the external situation data 202 and the vehicle state data 204. Multiple models for different driver classes may be used to achieve the accuracy desired.

A better model allows for a better estimate of the expected steering angle under null conditions and therefore a more accurate entropy $H_p$ under load-free driving. The particular situation adaptive driver model 200 used does not have to be of classical or optimal nature. For example, a hidden Markov (HMM) model is a probabilistic model known in the art which simply provides the likelihood that an attentive driver performs the observed steering action may be used. This approach may be used when multiple variables are integrated in the workload monitoring system 100 (e.g. steering angle and pedal depression as observables).

An autoregression moving average (ARMAX) model may be used with the road curvature profile and past observed steering angles as input to predict the steering angles. The processor 18 then uses these predicted steering angles to create the null distribution and entropy $H_p$. However, the particular model may be any statistical model that takes observed data as inputs and generates a predicted value based on the observed inputs.

The system and method described above uses a probability density function to generate the entropy $H_p$, which is then used to generate the workload index. Alternatively, the steering angle prediction errors may be used to create a cumulative distribution function of steering angle prediction errors. The cumulative distribution function can then be compared to the cumulative distribution function of the null distribution to generate a workload index. Additionally, any method designed to characterize and differentiate between two prediction error distributions, i.e. observed distribution and null distribution, can be used to obtain a measure of differentiation that can be correlated to driver workload. For example, the method may incorporate any statistical, spectral or shape analysis to characterize and differentiate the two distributions, which can then be correlated to driver workload.

The system and method of the present invention may be used to detect severe error corrections. For example, observations that deviate significantly from the predicted steering angle, i.e., outliers, can be detected. Given the null distribution, outliers that can with high degree of certainty be associated with error corrections that followed a surprise situation, can be used to detect critical situations instantaneously. The workload monitoring device 12 may be configured so that an audible and/or visual signal is sent to the driver when the processor 18 detects such a critical situation.

The system and method of the present invention may also be used to detect drowsiness. The drowsiness condition is normally characterized by an abnormally low steering angle prediction error for an extended period of time. In this situation, attention is not redirected but is merely reduced which in essence has the same effect, namely an increase or complete lack of error corrective behavior, both of which alter $H_p$ considerable and can be detected. In this respect the present invention may also detect drowsiness. Further, drowsiness may be distinguished from a highly loaded task in that the entropy would be expected to go down. Additionally, the adjustment to warning systems and other driver assist systems will be similar for both drowsiness and secondary task execution.

For example, in the event of severe drowsiness, the driver may not make an error correction and simply crash. In such a case, the workload monitoring device 12 determines that the driver workload is low, based on lack of steering based on either error buildup during secondary task execution or a result of a near-sleep state. The workload monitoring device 12 may be configured to provide the workload index value to a system that either alerts or assists the driver in such situations. Additionally, a situation adaptive driver model 200 with road curvature as input may provide a more accurate characterization of the driver's behavior in such situations.

The prediction error based workload index presented herein may also be used in longitudinal control by using accelerator release, brake pedal depression, wheel angle and other control variables as observables rather than steering angle. Under fully attentive driving, drivers may exhibit a relatively smooth control in terms of engine control and soft braking. Under loaded conditions, error corrective behavior is hypothesized to be characterized by more abrupt and perhaps stronger accelerator release or brake pedal depression. The observable control variables can also be combined in a joint distribution. Similar to the steering angle as an observable, the null distribution of prediction errors may be compared against that observed distribution of prediction errors and the result used as an index of workload. HMMs or other statistical methods capable of temporal data characterization can be used to provide the flexibility and statistical nature required for prediction error characterization in situations with multiple observables.

The present invention may also be used in "smart car" applications by informing the vehicle's control system that the driver may need extra assistance because he/she is experiencing a high workload. In short, the steering entropy method can be considered suitable for the smart car in that it establishes a non-invasive communication from the driver to the vehicle's control system.

Described has been a method and apparatus that quantifies deviations from load-free steering angle prediction error distributions as an index for workload. An advantage of the invention is that it can easily be implemented in a real car since it requires only a steering angle sensor and does not require any external measurements such as lane position or difficult to obtain time-to-lane crossing. Another advantage of the invention is that it requires minimal memory to implement and can be easily customized to individual driver characteristics. An additional advantage of the invention is that the system only weakly depends on the road curvature profile and may be used to monitor driver workload as the vehicle is driven on all types of roads in all types of road conditions. A further advantage of the invention is that the system uses a non-invasive communication from the driver to establish a workload index and does not create additional work for the driver. In this disclosure, there is shown and described only certain preferred embodiments of the invention, but, as aforementioned, it is to be understood that the invention is capable of use in various other combinations and environments and is capable of changes or modifications within the scope of the inventive concept as expressed herein.

What is claimed is:

1. A method for determining driver workload comprising:
   monitoring a steering angle of a vehicle over time;
   estimating a predicted steering angle of the vehicle over time based on the monitored steering angle;
   generating steering angle prediction errors based on the predicted steering angle and the monitored steering angle at predetermined points in time; and
   generating a workload value based on the steering angle prediction errors.

2. The method of claim 1, further comprising:
   generating a distribution of said steering angle prediction errors.

3. The method of claim 2, wherein the step of generating a distribution of said steering angle prediction errors further comprises:
   establishing a predetermined number of bins, each bin representing a range of possible steering angle prediction errors; and
   categorizing the generated steering angle prediction errors into the predetermined number of bins.

4. The method of claim 3, wherein the step of generating a workload value further comprises:
   generating, for each bin, a probability that each of the steering angle prediction errors will fall in each bin based on the number of the generated steering angle prediction errors in each bin.

5. The method of claim 4, further comprising:
generating an entropy value based on the probability for each bin.

6. The method of claim 5, further comprising:
comparing the generated entropy value with a predetermined entropy value to generate the workload value.

7. The method of claim 1, wherein the step of estimating the predicted steering angle comprises:
performing a Taylor series expansion of the monitored steering angle at predetermined times to generate predicted steering angles at the predetermined points in time.

8. A system for generating a workload value representing a driver's workload comprising:
an input device configured to receive a steering angle signal representing the angle of a vehicle's steering wheel; and
a workload monitoring device coupled to the input device and configured to:
receive the steering angle signal;
generate a predicted steering angle at predetermined times based on the received steering angle signal;
compare the predicted steering angle at the predetermined times to the steering angle signal to generate predicted steering angle errors; and
generate the workload value based on said errors.

9. A system for generating a workload value representing a driver's workload comprising:
an input device configured to receive a steering angle signal representing the angle of a vehicle's steering wheel; and
a workload monitoring device coupled to the input device and configured to:
receive the steering angle signal,
generate a predicted steering angle at predetermined times,
compare the predicted steering angle to the steering angle signal to generate predicted steering anile errors at the predetermined times,
generate a distribution of the predicted steering angle errors, and
generate the workload value based on said distribution.

10. The system of claim 9, wherein the workload monitoring device is further configured to:
establish a predetermined number of bins, each bin representing a range of possible steering angle prediction errors; and
categorize the steering angle prediction errors into the predetermined number of bins.

11. The system of claim 10, wherein the workload monitoring device is further configured to:
generate, for each bin, a probability that each of the steering angle prediction errors will fall in each bin based on the number of the steering angle prediction errors in each bin.

12. The system of claim 11, wherein the workload monitoring device is further configured to:
generate an entropy value based on the probability for each bin.

13. The system of claim 12, wherein the workload monitoring device is further configured to:
compare the generated entropy value with a predetermined entropy value to generate the workload value.

14. A system for generating a workload value representing a driver's workload comprising:
an input device configured to receive a steering angle signal representing the angle of a vehicle's steering wheel; and
a workload monitoring device coupled to the input device and configured to:
receive the steering angle signal,
perform a Taylor series expansion of the received steering angle signal at predetermined times to generate predicted steering angles at the predetermined times, and
generate a workload value based on the received steering angle signal.

15. The system of claim 14, wherein the workload monitoring device is further configured to:
compare the predicted steering angles to the steering angle signal at the predetermined times to generate the steering angle prediction errors.

16. A method for determining driver workload comprising:
monitoring a steering angle of a vehicle over a period of time;
estimating a predicted steering angle of the vehicle at least at predetermined intervals of time;
generating steering angle prediction errors based on the predicted steering angle and the monitored steering angle at the predetermined intervals of time;
generating a distribution of the steering angle prediction errors;
generating a first entropy value based on the distribution of the steering angle prediction errors;
comparing the first entropy value to a second entropy value based on steering angle prediction errors obtained under load-free driving conditions; and
generating a workload index based on the result of the comparing step.

17. The method of claim 16, further comprising:
updating the second entropy value based on the road geometry and environmental conditions.

18. The method of claim 16, wherein the step of generating a first entropy value includes:
computing the first entropy value based on a predetermined number of the steering angle prediction errors over a predetermined time.

19. A method for determining driver workload comprising:
monitoring a control variable of a vehicle over time;
estimating a predicted control variable of the vehicle over time based on the monitored control variable;
generating prediction errors, at predetermined intervals of time, based on the monitored control variable and the predicted control variable; and
generating a value representative of the driver workload based on the prediction errors.

20. The method of claim 19, wherein the monitoring step comprises monitoring at least one of a plurality of control variables comprising variables representing the vehicle's acceleration, the vehicle's braking, the vehicle's wheel angle and the vehicle's steering angle.

21. The method of claim 19, wherein the step of generating a workload value further comprises:
sorting said control variable prediction errors to create a distribution of control variable prediction errors; and comparing the distribution to a predetermined distribution to generate the workload value.

22. A method for determining driver workload comprising:
monitoring the steering angle of the vehicle over time;
estimating a predicted steering angle of the vehicle over time;
generating steering angle prediction errors based on the predicted steering angle and the monitored steering angle at predetermined points in time; and
generating a workload value in response to the steering angle prediction errors.

23. A method as in claim 22, wherein the step of generating the workload value comprises calculating an entropy value using the steering angle prediction errors.

24. A method as in claim 23, wherein the step of generating the workload value further comprises comparing the calculated entropy value to a reference value for entropy.

25. A method as in claim 22, wherein the step of estimating comprises performing a Taylor series expansion of the monitored steering angle at the predetermined points in time.

26. A system for generating a workload value representing a driver's workload comprising:
an input device configured to generate a steering angle signal representing the angle of a vehicle's steering wheel; and
a workload monitoring device coupled to the input device and configured to:
receive the steering angle signal;
generate a predicted steering angle at predetermined intervals,
compare the predicted steering angle at the predetermined intervals to the steering angle signal to determine predicted steering angle errors, and
generate the workload value based on the predicted steering angle errors.

27. A system as in claim 26, wherein the workload monitoring device comprises a processor, a working memory and a program memory storing a program for the processor defining the configuration of the workload monitoring device.

28. A system as in claim 26, wherein the workload monitoring device is further configured to generate the predicted steering angle at predetermined intervals through processing the received steering angle signal.

29. A system as in claim 28, wherein the processing of the received steering angle signal comprises performing a Taylor series expansion of values of the steering angle signal at the predetermined intervals.

30. A system as in claim 26, wherein the workload monitoring device is further configured to calculate an entropy value from the predicted steering angle errors.

31. A system as in claim 30, wherein the workload monitoring device is further configured to generate the workload value from a comparison of the calculated entropy value to an entropy reference value.

32. A method for determining driver workload comprising:
monitoring a control variable on a vehicle;
estimating predictions of the control variable of the vehicle at intervals of time;
generating prediction errors at the intervals of time based on the predictions of the control variable and the monitored control variable; and
generating a value representative of the driver workload based on the prediction errors.

33. A system for generating a workload value representing a driver's workload comprising:
an input device configured to monitor a control variable on a vehicle and generate a signal in response to the monitored control variable; and
a workload monitoring device coupled to the input device and configured to:
receive the control variable signal;
generate predictions of the control variable of the vehicle at intervals of time;
generate prediction errors at the intervals of time based on the predictions of the control variable and the control variable signal; and
generate a value representative of the driver workload based on the prediction errors.

34. A system as in claim 33, wherein the workload monitoring device is further configured to generate the predictions of the control variable based on processing of the control variable signal.

35. A system as in claim 33, wherein the workload monitoring device comprises a processor, a working memory and a program memory storing a program for the processor defining the configuration of the workload monitoring device.

36. A method for determining driver workload comprising:
monitoring a parameter of a state of the vehicle, over time;
estimating a predicted variable related to steering of the vehicle, over time, based on the monitored parameter;
generating prediction errors based on the predicted variable at intervals of time and actual values of a variable related to the steering of the vehicle; and
generating a value representative of the driver workload based on the prediction errors.

37. A method as in claim 36, wherein the step of generating prediction errors comprises:
deriving the actual values of the variable related to the steering of the vehicle from the monitoring of the parameter; and
comparing the derived actual values to values of the predicted variable at the intervals of time.

* * * * *